Aug. 17, 1926.

M. P. HOLMES 1,596,434

CLUTCH CONTROLLING MECHANISM

Filed Oct. 17, 1921

Inventor:
Morris P. Holmes
by

Attorney.

Patented Aug. 17, 1926.

1,596,434

UNITED STATES PATENT OFFICE.

MORRIS P. HOLMES, OF CLAREMONT, NEW HAMPSHIRE, ASSIGNOR TO SULLIVAN MACHINERY COMPANY, A CORPORATION OF MASSACHUSETTS.

CLUTCH-CONTROLLING MECHANISM.

Application filed October 17, 1921. Serial No. 508,391.

My invention relates to clutch controlling mechanism.

It has for its object to provide an improved clutch controlling mechanism. A further object of my invention is to provide an improved controlling mechanism for a friction clutch whereby it is possible to equalize the pressure and thereby improve the effectiveness and wearing qualities of the clutch, and also to simplify and cheapen the construction.

In the accompanying drawings I have shown for purposes of illustration one embodiment which my invention may assume in practice, the same being illustrated in connection with the main friction of a mining machine.

In these drawings,—

Figure 1:
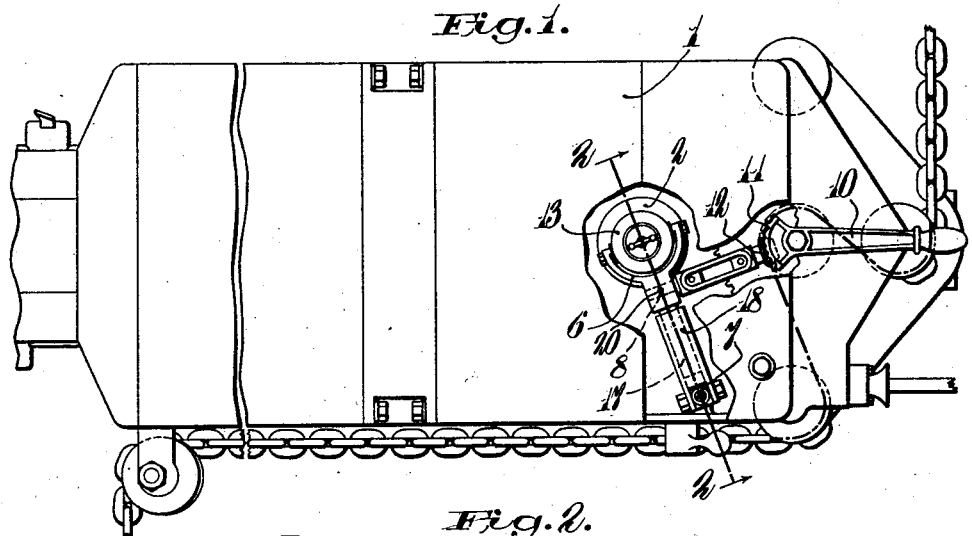
Fig. 1 is a plan view of a mining machine equipped with this form of my improvement, a portion of the casing being broken away to facilitate illustration.
Figure 2:
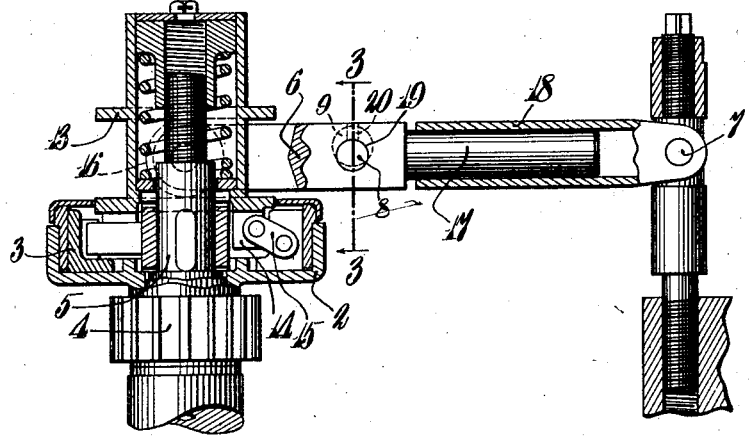
Fig. 2 is a detail sectional view on line 2—2 of Fig. 1.
Figure 3:
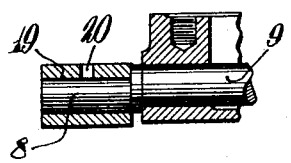
Fig. 3 is a detail sectional view on line 3—3 of Fig. 2.

In this illustrative construction I have shown my invention as applied to a clutch mechanism of the type described and claimed in my Patent 1,347,811, dated July 27, 1920, it being noted that the construction in general resembles that construction, the same being herein applied to a mining machine 1 having a toggle operated main friction clutch, including the driven and driving elements 2, 3, controlling the feeding mechanism thereof and specifically controlling the connection of a gear 4 to an upright shaft 5, the movement of the friction clutch being in turn controlled by clutch shipper mechanism including a clutch shipper member 6 disposed horizontally and pivotally and adjustably connected at one end as at 7 to the frame, and operatively connected at a point intermediate its ends, through an eccentric 8 carried on a rotatable shaft 9, to an operating lever 10 having a toothed sector 11 engaging a bevel gear 12 on the opposite end of the shaft 9.

In my improved construction it will be observed that the clutch 2, 3 is provided with a laterally flanged member 13 having parallel annular flanges and attached to a member 14 which operates the inner movable clutch member 3 and herein is connected through pivoted toggle links 15 to the member 3. Between the flanges formed on this member 13 rollers 16 are disposed, the same being carried on the ends of the arms of the shipper 6. Further in my improved construction it will be noted that at a point preferably as herein between the pivot 7 and the eccentric 8, the shipper 6 is divided into two parts one movable bodily relative to the other and including a portion 17 slidable and rotatable in a sleeve 18 which is adjustably pivoted at 7 to the machine frame. Further, it will be noted that the eccentric 8 is seated in a close-fitting plain board bearing 19 in member 6 to which lubricant may be supplied through a suitable duct 20.

By this improved construction it will be noted that an exceedingly rugged device is produced which, due to the provision of the rollers and the flanges on the member 13, has a long life, and in which due to the provision of the rotatable and slidable connection 17, 18, it is made possible to deliver equal pressures on the two rollers at the same time that it is made possible to eliminate any necessity for slotting the shipper member to receive the eccentric, a construction thus being produced which is more rugged and better adapted to withstand the demands of service at the same time that one is provided which gives better service and may be manufactured at smaller expense.

While I have in this application specifically described one embodiment which my invention may assume in practice, it will be understood that this form of the same is shown for purposes of illustration and that the invention may be modified and applied to various other forms of clutches without departing from its spirit or the scope of the appended claims.

What I claim as new and desire to secure by Letters Patent is:

1. In a clutch controlling mechanism, a clutch including a movable element, and operating means therefor including an eccentric and a pivotally connected shipper having its operating end bodily rotatable relative to its pivoted end.

2. In a clutch controlling mechanism, a clutch including a movable element, and operating means therefor including an eccentric and a pivotally connected shipper having its operating end slidable and rotatable relative to its pivoted end.

3. In a clutch controlling mechanism, a clutch including a movable element, and operating means therefor including a bore and a cooperating eccentric and a pivotally connected shipper having its operating end rotatable relative to its pivoted end.

4. In a clutch controlling mechanism, a clutch including an element movable to effect clutch engagement and disengagement, and operating means for said movable element including a pivotable shipper having an operating end movable translatorily to effect clutch engagement and having a pivoted end, said operating end being slidable and rotatable relative to said pivoted end.

5. In a clutch controlling mechanism, a clutch including a movable element, and operating means therefor including a pivotally connected shipper having its operating end bodily movable relative to its pivoted end and an operating member operatively pivotally connected to the operating end thereof.

6. In a clutch controlling mechanism, a clutch including a movable element, and operating means therefor including a pivotally connected shipper having its operating end bodily movable relative to its pivoted end and an operating member operatively pivotally connected intermediate the ends of the operating end thereof.

7. In a clutch controlling mechanism, a clutch including a movable element, and operating means therefor including a pivotally connected shipper having its operating end bodily movable relative to its pivoted end and an operating eccentric operatively connected to the operating end thereof.

8. In a clutch controlling mechanism, a clutch including a movable element, and operating means therefor including a pivotally connected shipper having its operating end bodily movable relative to its pivoted end and an eccentric journaled in a close fit in the operating end thereof.

9. In a clutch controlling mechanism, a clutch including a movable element, and operating means therefor including a pivotally connected two part shipper having its operating end bodily movable relative to its pivoted end and an eccentric journaled in a close fit in the operating end thereof.

10. In a clutch controlling mechanism, a clutch including a movable element, and pivoted operating means therefor including a plurality of telescopic elements, one element being rotatable relative to the other and slidable relative to its pivoted end during movement of said clutch element.

11. In a clutch controlling mechanism, a clutch including a movable element, and operating means therefor including a pivotally connected shipper having its operating end rotatable on an axis in a line intersecting the axis of its pivot and an operating member pivotally connected to the operating end thereof.

12. In a clutch controlling mechanism, a clutch including a movable element, and a pivoted shipper having its operating end engaging said element and adapted to force said element into clutch engaging position and means to permit longitudinal movement of the operating end thereof when said clutch is applied.

13. In a clutch controlling mechanism, a clutch including a movable element, means forming a flanged member surrounding the axis of said clutch and operatively connected to said movable element, a pivoted shipper swingable about an axis transverse to and offset from said first mentioned axis and having actuating means on one end engageable with said flanged member, said shipper comprising a plurality of elements one movable bodily relative to the other, and shipper operating means operatively connected to the element carrying said actuating means.

14. In a clutch controlling mechanism, a clutch including a movable element, means forming a flanged member surrounding the axis of said clutch and operatively connected to said movable element, a pivoted shipper having actuating means on one end engageable with said flanged member, said shipper comprising a plurality of elements one movable bodily relative to the other, and shipper operating means including an eccentric journaled in the element carrying said actuating means.

15. In a clutch controlling mechanism, a clutch including a movable element, means forming a flanged member surrounding the axis of said clutch and operatively connected to said movable element, a pivoted shipper swingable about an axis parallel to but offset from a line perpendicular to said first mentioned axis and having rollers on one end engageable with said flanged member, said shipper comprising a plurality of elements one movable bodily relative to the other, and shipper operating means operatively connected to the element carrying said rollers.

16. In a clutch controlling mechanism, a clutch including a movable element, means forming a flanged member surrounding the axis of said clutch and operatively connected to said movable element, a pivoted shipper having rollers on one end engageable with opposite sides of said flanged member, said shipper comprising a plurality of elements one rotatable and also longitudinally movable relative to another, and shipper operating means operatively connected to the element carrying said rollers.

17. In a clutch controlling mechanism, a clutch including a movable element, means forming a flanged member surrounding the axis of said clutch and operatively connected to said movable element, a pivoted shipper having rollers on one end engageable with said flanged member and comprising a plurality of elements one movable bodily relative to the other, and operating mechanism including an eccentric journaled in the element thereof carrying said rollers.

18. In a clutch controlling mechanism, a clutch including a movable element, means forming a flanged member surrounding the axis of said clutch and operatively connected to said movable element, a pivoted shipper having actuating means engageable with said flanged member, said shipper being pivotable as a whole about an axis in a plane parallel to but offset from said axis and comprising a plurality of elements one rotatable relative to another, and shipper operating means operatively connected to the element carrying said actuating means.

19. In a clutch controlling mechanism, a clutch including a movable element, means forming a flanged member surrounding the axis of said clutch and operatively connected to said movable element, a pivoted shipper having actuating means engageable with said flanged member, said shipper comprising a plurality of elements one rotatable and slidable relative to another, and shipper operating means operatively connected to the element carrying said actuating means.

20. In a clutch controlling mechanism, a clutch including a movable element, means forming a flanged member surrounding the axis of said clutch and operatively connected to said movable element, a pivoted shipper having actuating means engageable with said flanged member, said shipper comprising a plurality of elements one rotatable relative to another, and an eccentric cooperating with said rotatable element.

21. In a clutch controlling mechanism, a clutch including a movable element, operating means therefor including a telescopic two part shipper pivoted about a transverse axis and operable to force said movable element into clutch engaging position, and means to adjust the relative position of said axis.

22. In a clutch controlling mechanism, a clutch including a movable element, operating means therefor including a telescopic pivoted shipper and a cooperating eccentric adapted to swing said shipper on its pivot to effect clutch engagement, and a lever for operating said eccentric.

In testimony whereof I affix my signature.

MORRIS P. HOLMES.